United States Patent
Bass et al.

(10) Patent No.: US 8,389,889 B2
(45) Date of Patent: Mar. 5, 2013

(54) METHOD AND SYSTEM FOR LASER-BASED FORMATION OF MICRO-SHAPES IN SURFACES OF OPTICAL ELEMENTS

(75) Inventors: Isaac Louis Bass, Castro Valley, CA (US); Gabriel Mark Guss, Manteca, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 308 days.

(21) Appl. No.: 12/818,094

(22) Filed: Jun. 17, 2010

(65) Prior Publication Data
US 2011/0259860 A1 Oct. 27, 2011

Related U.S. Application Data

(60) Provisional application No. 61/327,025, filed on Apr. 22, 2010.

(51) Int. Cl.
*B23K 26/00* (2006.01)

(52) U.S. Cl. ........... 219/121.6; 219/121.69; 219/121.72; 219/121.83

(58) Field of Classification Search ............. 219/121.72, 219/121.6, 121.69, 121.83, 12.65
See application file for complete search history.

(56) References Cited

U.S. PATENT DOCUMENTS

| | | | |
|---|---|---|---|
| 5,665,134 A | 9/1997 | Kirby et al. | |
| 6,329,632 B1 | 12/2001 | Fournier et al. | |
| 6,518,539 B2 * | 2/2003 | Hackel et al. | 219/121.6 |
| 6,620,333 B2 * | 9/2003 | Brusasco et al. | 216/24 |
| 6,878,900 B2 * | 4/2005 | Corkum et al. | 219/121.69 |
| 6,951,995 B2 * | 10/2005 | Couch et al. | 219/121.67 |
| 7,154,091 B2 * | 12/2006 | Zewail et al. | 250/311 |
| 2003/0235385 A1 * | 12/2003 | Taylor et al. | 385/129 |

OTHER PUBLICATIONS

Bass et al., "Mitigation of laser damage growth in fused silica NIF optics with a galvanometer scanned CO2 laser," Proc. SPIE Int. Soc. Opt. Eng., 2006; 6261: 62612A1-A10.
Bass et al., "Mitigation of laser damage growth in fused silica with a galvanometer scanned CO2 laser," Proc. SPIE, 2005, 5991:59910C1-C9.
Brusasco et al., "Localized CO2-laser treatment for mitigation of 351-nm damage growth in fused silica," Proc. SPIE Int. Soc. Opt. Eng., 2002; 4679: 40-47.
Hrubesh et al., "Methods for mitigating surface damage growth in NIF final optics" Proc. SPIE, 2002; 4679: 23-33.

* cited by examiner

*Primary Examiner* — Michael Trinh (57) ABSTRACT

A method of forming a surface feature extending into a sample includes providing a laser operable to emit an output beam and modulating the output beam to form a pulse train having a plurality of pulses. The method also includes a) directing the pulse train along an optical path intersecting an exposed portion of the sample at a position i and b) focusing a first portion of the plurality of pulses to impinge on the sample at the position i. Each of the plurality of pulses is characterized by a spot size at the sample. The method further includes c) ablating at least a portion of the sample at the position i to form a portion of the surface feature and d) incrementing counter i. The method includes e) repeating steps a) through d) to form the surface feature. The sample is free of a rim surrounding the surface feature.

23 Claims, 6 Drawing Sheets

METHOD AND SYSTEM FOR LASER-BASED FORMATION OF MICRO-SHAPES IN SURFACES OF OPTICAL ELEMENTS

CROSS-REFERENCES TO RELATED APPLICATIONS

This application claims priority to U.S. Provisional Patent Application No. 61/327,025, filed on Apr. 22, 2010, entitled "LASER METHOD OF PRODUCING MICRO-SHAPES IN THE SURFACES OF OPTICS AND OTHER MATERIALS," the disclosure of which is hereby incorporated by reference in its entirety.

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Laser machining has been used in the automobile, aerospace, and electronics industries. For example, lasers are used in sheet metal cutting, drilling, and milling. In microelectronics, lasers are employed to scribe wafers, trim passive film elements, and obtain alloy p-n junctions of semiconductors. The advancements in laser machining are mainly due to the possibility of making small and unique structures that are difficult to achieve with conventional methods, and its applicability to traditionally hard-to-work materials such as ceramics, glass, and composite materials. Laser drilling has been widely used in industry because of its high production rate, capacity for rapidly varying hole size, for drilling holes at shallow angles, and for drilling traditionally hard-to-work materials such as ceramics and composite materials.

Despite the advancements made in laser machining, there is a need in the art for improved laser-based machining systems and methods of using the same.

SUMMARY OF THE INVENTION

According to the present invention, methods and systems for forming surface features on optical elements are provided. These surface features are formed in order to remove surface damage present on the optical element as well as to prevent re-initiation or growth of damage sites due to subsequent laser irradiation. More particularly, embodiments of the present invention provide methods and systems to ablate material from the surface region of the optical element using a plurality of laser pulses scanned across the surface of the optical element in a predetermined manner. The methods and systems described herein can be applied to other applications as well.

According to an embodiment of the present invention, a method of forming a surface feature extending into a sample is provided. The method includes providing a laser operable to emit an output beam and modulating the output beam to form a pulse train having a plurality of pulses. The method also includes a) directing the pulse train along an optical path intersecting an exposed portion of the sample at a position i and b) focusing a first portion of the plurality of pulses to impinge on the sample at the position i. Each of the plurality of pulses is characterized by a spot size at the sample. The method further includes c) ablating at least a portion of the sample at the position i to form a portion of the surface feature, d) incrementing counter i, and e) repeating steps a) through d) to form the surface feature. The sample is substantially free of a rim surrounding the surface feature.

According to another embodiment of the present invention, a method of processing an optical element is provided. The method includes providing a laser system operable to emit an output beam comprising a plurality of pulses and directing the plurality of pulses to impinge on a surface of the optical element. The method also includes ablating a region of material adjacent the surface by evaporation of melted material. A beam waist of the each of the plurality of pulses at the surface of the optical element is less than 150 µm in diameter. The method further includes scanning the plurality of pulses to traverse a predetermined portion of the surface of the optical element and repeating the ablating and scanning to form a surface feature extending below the surface of the optical element. A peripheral height of the surface feature above the surface of the optical element is less than 100 nm.

Numerous benefits are achieved using the present invention over conventional techniques. For example, in an embodiment according to the present invention, material is removed from the surface region of the optical element without significant thermo-capillary flow, leaving a shape of the surface that reduces downstream intensification compared to other laser ablation processes. Embodiments of the present invention remove material without melting large volumes of material, thus reducing the residual stress associated with the surface feature after formation. Additionally embodiments of the present invention prevent and/or mitigate damage to optical components (e.g., arrest the growth of damage sites) used in high power or high energy laser or optical systems. Embodiments of the present invention are applicable to optical components used in medical devices and semiconductor capital equipment including photolithography processes. According to embodiments of the present invention, methods and systems are provided that are useful in the production of micro-optical components such as micro-lenses and lens arrays. Depending upon the embodiment, one or more of these benefits may exist. These and other benefits have been described throughout the present specification and more particularly below.

Various additional objects, features and advantages of the present invention can be more fully appreciated with reference to the detailed description and accompanying drawings that follow.

DETAILED DESCRIPTION OF THE SPECIFIC EMBODIMENTS

Embodiments of the present invention provide methods and systems for scanning a tightly focused, pulsed, laser spot across the surface of a material in order to ablate or evaporate small amounts of the material with each pulse. The laser light is typically strongly absorbed in a surface region of the material. A series of pulses producing ablation areas are used to produce predetermined shapes in the surface of the material. Embodiments of the present invention have been applied to remove laser damaged material from the surface of an optical element leaving a shape in the surface of the material that generates a desired pattern of laser light that has passed through the shape. The formation of the shape in the surface prevents further growth of the laser damaged material with subsequent laser exposure as well as damage to downstream optics due to intensification of the laser beam by the residual shape in the surface. The techniques described herein may be used in other optics application to control surface shapes, particularly on the micro-scale.

Carbon dioxide ($CO_2$) lasers emit coherent radiation at 10.6 μm, which is strongly absorbed in optical glass used to fabricate many optical elements. $CO_2$ lasers have been used successfully to mitigate (arrest) the growth of laser damage in the surface of fused silica optics by both melting and ablating or evaporating (herein grouped together and referred to as ablating) the damaged/defective material located at the damage site. $CO_2$ laser-based mitigation can be effective in removing the defects originally present at the damage site by either removal of the defective material from the surface of the optical element or by annealing the defects at high temperatures. In some applications of interest, surface defects ranging in diameter/size from tens of microns to 500 μm or greater are treated using embodiments of the present invention to depths ranging from several microns to 300 μm and deeper.

Some ablative mitigation processes operate by removing the entire damage site with one or several high temperature blasts. As an example, one technique utilized three scans of a 200 μm diameter laser spot in an inwardly moving spiral over the damage site. The spot speed varied from 180 mm/s to 14 mm/s depending on the radius. Each scan lasted approximately 150 ms, while the laser power varied from 2 to 12 W continuous wave (CW) in a prescribed way during the scan. In order to ablate enough material to completely mitigate these damage sites, large areas of the surface were subjected to temperatures between about 2500K and 3000K for the 150 ms duration of a scan. This resulted in re-deposition of some of the ablated material from the site and thermo-capillary driven flow of silica along the surface of the mitigation pit. The re-deposited material was prone to further laser damage during subsequent system operation.

Figure 1A:
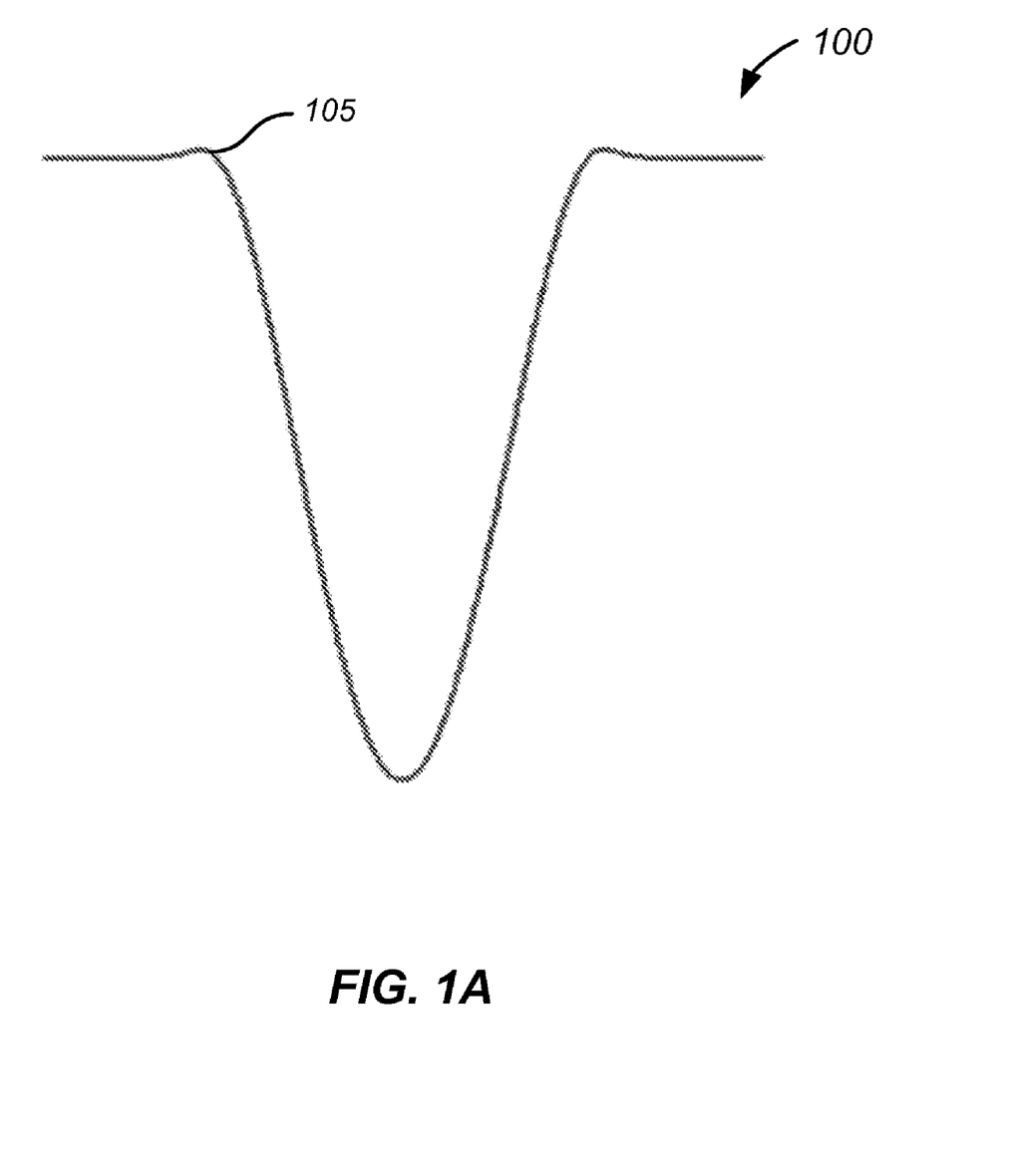
FIG. 1A is a simplified cross-section of a surface profile produced using a single laser ablation scan.

FIG. 1A is a simplified cross-section of a surface profile produced using a single laser ablation scan. The laser ablation process produces a pit or recess 100 in the optical element extending a predetermined depth into the material. A raised rim 105 is present on the periphery of the recess as a result of thermo-capillary flow during the single pulse ablation process. It should be noted that although the surface profile including a raised rim 105 illustrated in FIG. 1A can be produced using a single laser scan, similar shapes can be produced using several (e.g. 3-5) laser scans.

As light propagates through the surface feature illustrated in FIG. 1A (e.g., along an optical path aligned with a vertical axis in the plane of the figure), the raised rim 105 will refract and diffract the laser light passing through it during subsequent operation of the system that initiated the original damage. In particular, because the raised rim is cylindrically symmetric, on-axis intensification sufficient to damage downstream optics can be produced by the outer slope of the rim Annular intensification sufficient to cause damage is also produced by the focusing effect of the top of the rim. In addition to downstream optics, if the mitigation is performed on the input surface of an optical element, the intensification resulting from propagation through the raised rim could damage the optical element itself, for example, at the output surface.

Figure 1B:
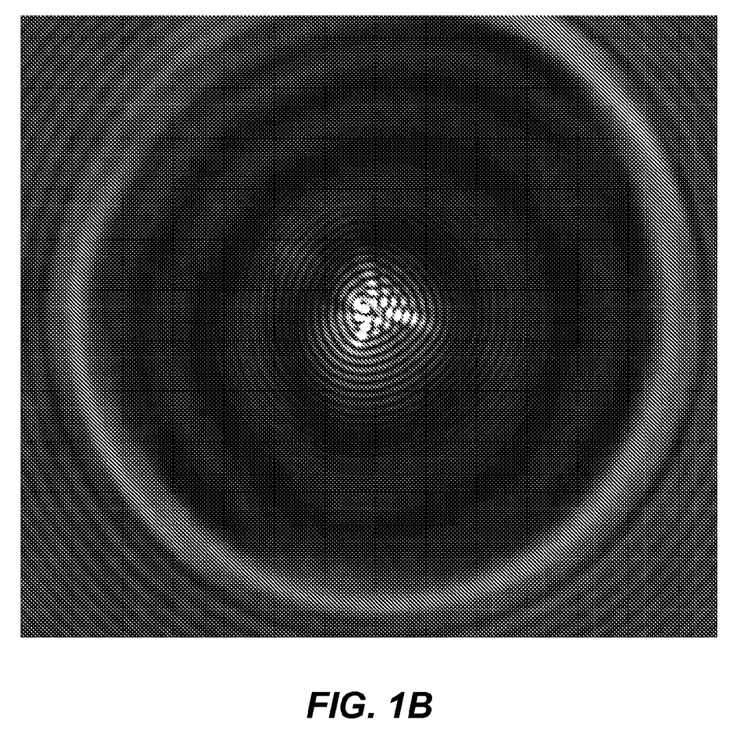
FIG. 1B is a simplified plot of the beam intensity downstream of the surface profile illustrated in FIG. 1A, illustrating a central intensity peak caused by the raised rim.

FIG. 1B is a simplified plot of the beam intensity downstream of the surface profile illustrated in FIG. 1A. As illustrated in FIG. 1B, the presence of the raised rim 105 produces an intense, on-axis hot-spot downstream from the mitigation site. It should be noted that any surface structure that can approximate a positive lens, the top of the rim, for example, can also produce the high intensification illustrated in FIG. 1B. The inventors have determined that the intensification illustrated in FIG. 1B can exceed 20:1 as a result of some surface features.

Figure 1C:
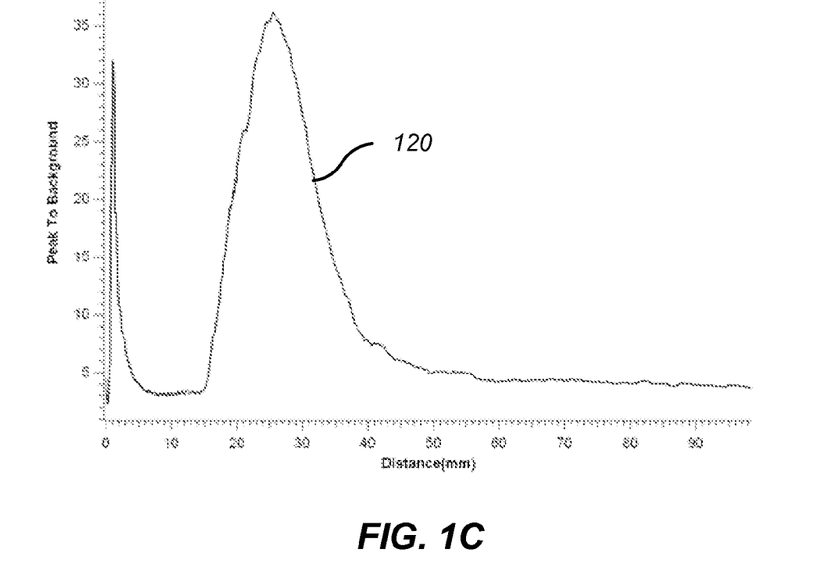
FIG. 1C is a simplified plot of the peak beam intensity as a function of the downstream propagation distance of the profile illustrated in FIG. 1A.

FIG. 1C is a simplified plot of the peak beam intensity produced by the profile of FIG. 1A as a function of the downstream propagation distance. As illustrated in FIG. 1C, the peak to background intensity ratio increases at a location approximate 25 mm from the surface feature illustrated in FIG. 1A. The inventors have determined that a method to reduce the impact of the intensification problem associated with the raised rim is to use a suitable laser to break up the symmetry of the circular raised rim by superimposing a random pattern of small ablation pits ("dimples") on the rim. This technique converts the circular rim into a "meandering" rim around the outer perimeters of the small pits. The break in symmetry has the effect of breaking the single on-axis intensification spot produced by the circular rim into a speckle-type pattern of spots of acceptably low intensification. Issues related to this approach include the fact that this method provides for limited control of the final shape since a rim is still present and the process typically results in a significant amount of the ablated material being re-deposited on the surface of the optical element. Because the re-deposited material is prone to laser damage, additional processing is typically used to re-melt the re-deposited material, resulting in an increase in the time and complexity of the process and increase of the residual stress in the optical element. Another technique to reduce the impact of the intensification problem associated with the raised rim includes lowering the $CO_2$ laser power to minimize the amount of thermo-capillary flow and avoid evaporation. Despite the benefits provided by this method, limited control of the final shape is provided and deep cracks in larger damage sites were not easily mitigated.

Figure 2A:
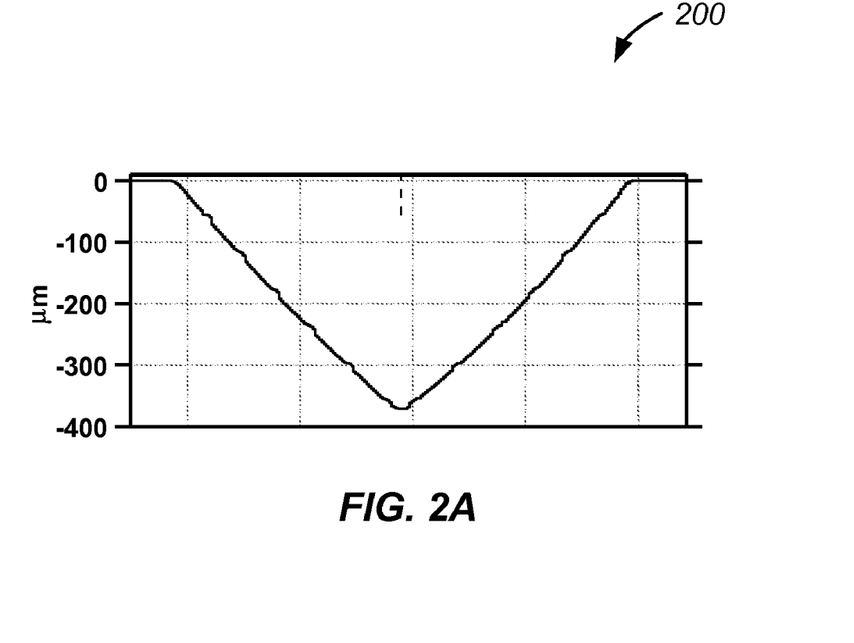
FIG. 2A is a simplified cross-section of a surface profile produced according to an embodiment of the present invention illustrating the absence of the raised rim caused by thermo-capillary flow.

FIG. 2A is a simplified cross-section of a surface profile produced using an embodiment of the present invention. Embodiments of the present invention provide a surface profile that enables control of the final shape of the surface mitigation feature so that downstream intensification resulting from the surface profile does not result in additional damage to optical elements. As described more fully throughout the present specification, embodiments of the present invention provide a technique that limits thermo-capillary driven flow to a small volume throughout the duration of the mitigation process, thereby avoiding the formation of surface features large enough to cause significant downstream intensification.

Figure 2B:
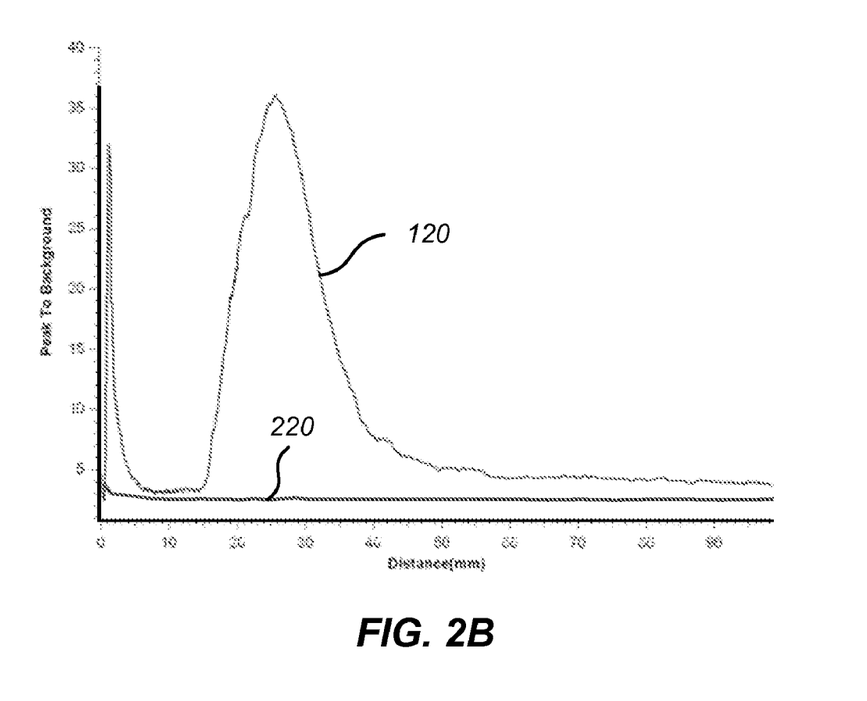
FIG. 2B is a simplified plot of the peak beam intensity of the profile illustrated in FIG. 1A overlaid with a plot of the peak beam intensity of the surface profile illustrated in FIG. 2A as functions of the downstream propagation distance.

Referring to FIG. 2A, the surface profile is characterized by a shape extending into the surface of the optical element without a raised rim 105 as produced in the surface profile shown in FIG. 1A. Because of the lack of the raised rim 105, light passing through the surface feature fails to focus at a downstream location as illustrated in FIG. 1C. Rather, as illustrated in FIG. 2B, the peak intensity 220 is substantially constant at a low value as a function of propagation distance. For purposes of comparison, FIG. 2B illustrates both the peak intensity as a function of propagation distance associated with the surface profile illustrated in FIG. 2A (curve 220) overlaid with the peak intensity downstream of the surface profile illustrated in FIG. 1A (curve 120). As clearly illustrated in FIG. 2B, embodiments of the present invention greatly reduce the downstream intensification associated with raised rim 105.

In order to form the surface profile illustrated in FIG. 2A, pulses with a temporal length of 12.5 µs and a beam waist of 130 µm ablating material in an area about 40 µm in diameter were directed to the sample surface and raster scanned in a predetermined pattern. The pulse repetition frequency was 2 kHz and the pulses had an energy of about 0.5 mJ. Over a time period of approximately 11 minutes, ablation from the laser pulses, which were more than one million in number, produced the illustrated surface profile. The surface profile, which is formed on the surface of the optical element, extends into the material of the optical element and is substantially free of a raised rim surrounding the surface feature.

Figure 3:
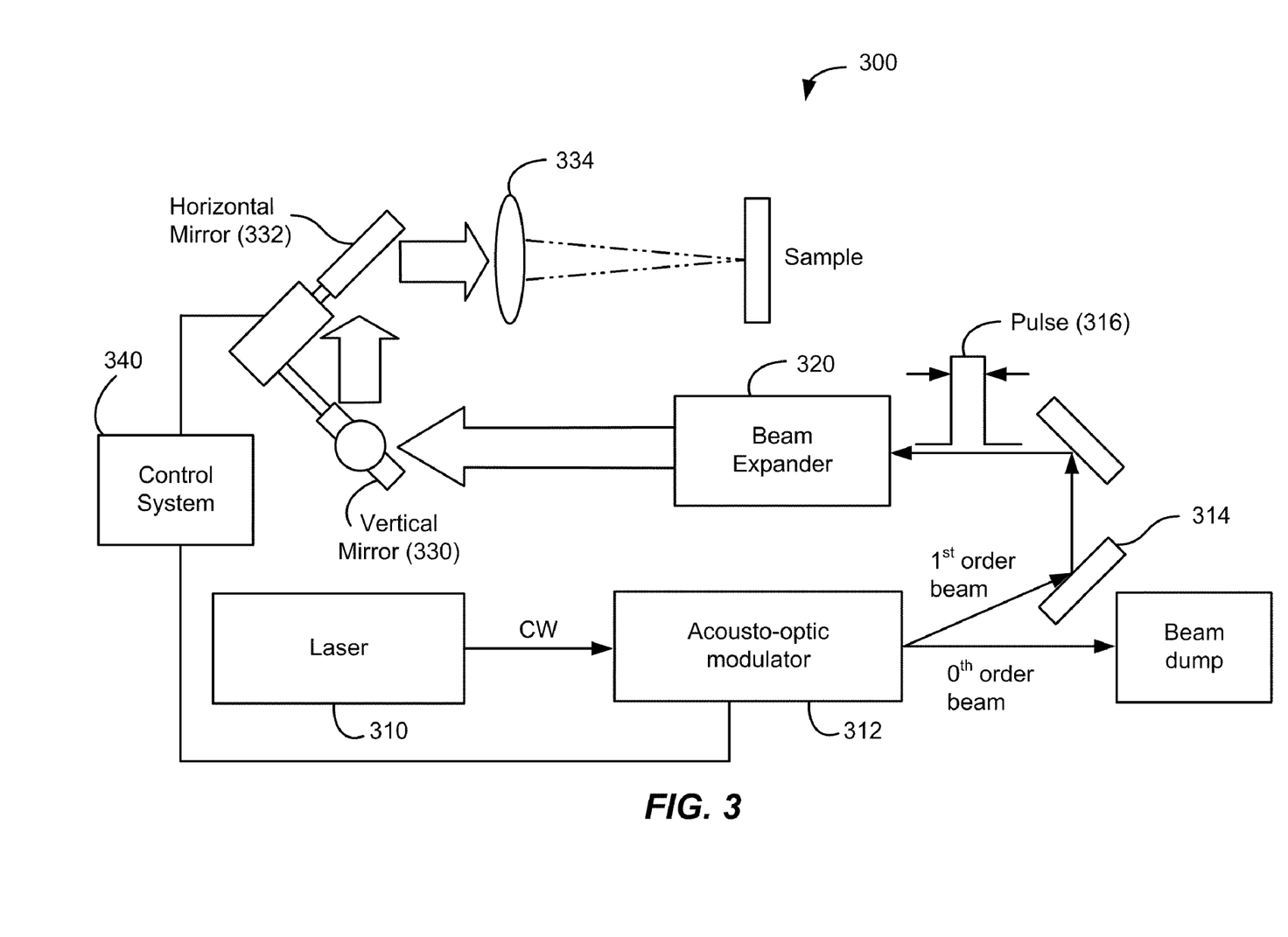
FIG. 3 is a simplified schematic diagram illustrating a laser processing system according to an embodiment of the present invention.

FIG. 3 is a simplified schematic diagram illustrating a laser processing system 300 according to an embodiment of the present invention. The system 300 includes a laser 310, for example, a 100 W, continuous wave (CW), $CO_2$ laser operating at 10.6 µm available from the GSI Group, Inc, of Rugby, England. In this embodiment, laser 310 generates a CW output beam. Although a CW $CO_2$ laser is discussed throughout the present specification, embodiments of the present invention are not limited to this particular laser and other lasers are included within the scope of the present invention. The output beam is passed through an acousto-optic modulator (AOM) 312 that modulates the output beam to form a pulse train having a plurality of pulses. As an example, the AOM 312 can be used to deflect a series of 12.5 µs laser pulses as a first order beam propagating towards mirror 314. As illustrated by pulse 316, the pulses in the pulse train are characterized by a pulse amplitude, a pulse width, a pulse shape (in this case top-hat, but other shapes are possible), and the like.

In the embodiment illustrated in FIG. 3, a CW laser and an external modulator is utilized to provide the pulse train. In other embodiments, laser 310 is a pulsed laser, such as a Q-switched or fiber laser, that produces a pulse train without the use of an external modulator. Additionally, although an AOM is illustrated in FIG. 3, other modulators can be utilized according to embodiments of the present invention, including electro-optic or mechanical modulators. One of ordinary skill in the art would recognize many variations, modifications, and alternatives.

The output beam produced by the AOM 312 is expanded and collimated to a beam diameter of approximately 20 mm using beam expander 320. The beam is then directed to a pair of galvanometer driven scanning mirrors 330 and 332 that produce an angular deflection of the beam. The output of the scanning mirrors is incident on a 100 mm focal length scan lens 334. Scan lens 334 focuses the beam to a spot approximately 130 µm in diameter on the surface of an optical element, for example, a fused silica optical element. The optical element can be a lens, a phase plate, a mirror, a vacuum window, a debris shield, or the like. In applications for which the sample is fused silica, the absorption coefficient of the fused silica is such that the 10.6 µm light is absorbed within 1 µm of the surface of the sample at the ablation temperature. Ablation of the sample material is produced as described more fully throughout the present specification. The focused spot is moved over the surface of the optical element in a predetermined pattern using the scanning mirrors 330 and 332. A control system 340 is coupled to the AOM 312 and the scanning mirrors 330 and 332 to enable firing of the AOM 312 in synchronism with the motion of the scanning mirrors 330 and 332.

Although a set of scanning mirrors 330 and 332 is illustrated in FIG. 3, embodiments of the present invention are not limited to this mechanism for scanning the beam across the surface of the sample. Other scanning techniques including a micro-mirror system, a spatial light modulator, and mechanical translation and rotation stages are included within the scope of the present invention. The sample may be mounted on a stage for position adjustment, tilt, or the like. One of ordinary skill in the art would recognize many variations, modifications, and alternatives.

Utilizing the system illustrated in FIG. 3, it is possible to form a variety of surface features. As an example, referring to FIG. 2A, a surface feature in the shape of a cone with lateral dimensions of 2 mm and a depth of 350 µm is illustrated. Other shapes that have been generated with the system include parabolic cones and four-sided pyramids with various dimensions and depths. The surface feature is substantially free of a raised-rim around the perimeter of the surface feature. The inventors have demonstrated that surfaces with laser damage sites as large as 500 µm in lateral extent and 280 µm in depth can be completely removed by ablation while producing a final shape that is essentially the same as that which would have been produced if no damage had been present. The high quality of the finished surface feature is demonstrated by the high damage threshold for these mitigation sites, which can be greater than 13 J/cm2 for a 5 ns flat-in-time pulse at 351 nm wavelength. In addition, the measured downstream intensification was below that at which downstream optics greater than 60 mm away would have damaged. As described below, embodiments of the present invention produce surface features with little to no residual stress in and around the final mitigation site. Moreover, the inventors have determined that the material that is re-deposited, which is small (nano-scale in size) in comparison to conventional techniques (micro-scale in size), has a high damage threshold. Moreover, the inventors have determined that the methods described herein are applicable to a wide variety of materials that absorb laser radiation, resulting in rapid ablation of melted material in a small volume at the surface. These materials include fused silica, glass, plastics, polymers, crystals, semiconductors, and the like.

Although embodiments of the present invention are discussed in relation to the formation of an optical element, such as a parabolic cone, a four-sided pyramid, embodiments of the present invention are applicable to the formation of any other prescribed geometric shape with dimensions comparable to the dimensions discussed herein. Additionally, although some embodiments are discussed in relation to the creation of a micro-optical element, arrays of micro-optic elements with geometric shapes and dimensions as discussed herein are also included within the scope of the present invention. Moreover, in addition to geometric shapes, representational or artistic reliefs are included within the scope of the present invention. Furthermore, in addition to optical materials such as fused silica and glass, biological materials are included within the scope of the invention and the methods described herein are suitable for use in medical applications, for example, eye surgery, analysis of biological tissue, and the like. One of ordinary skill in the art would recognize many variations, modifications, and alternatives.

Figure 4:
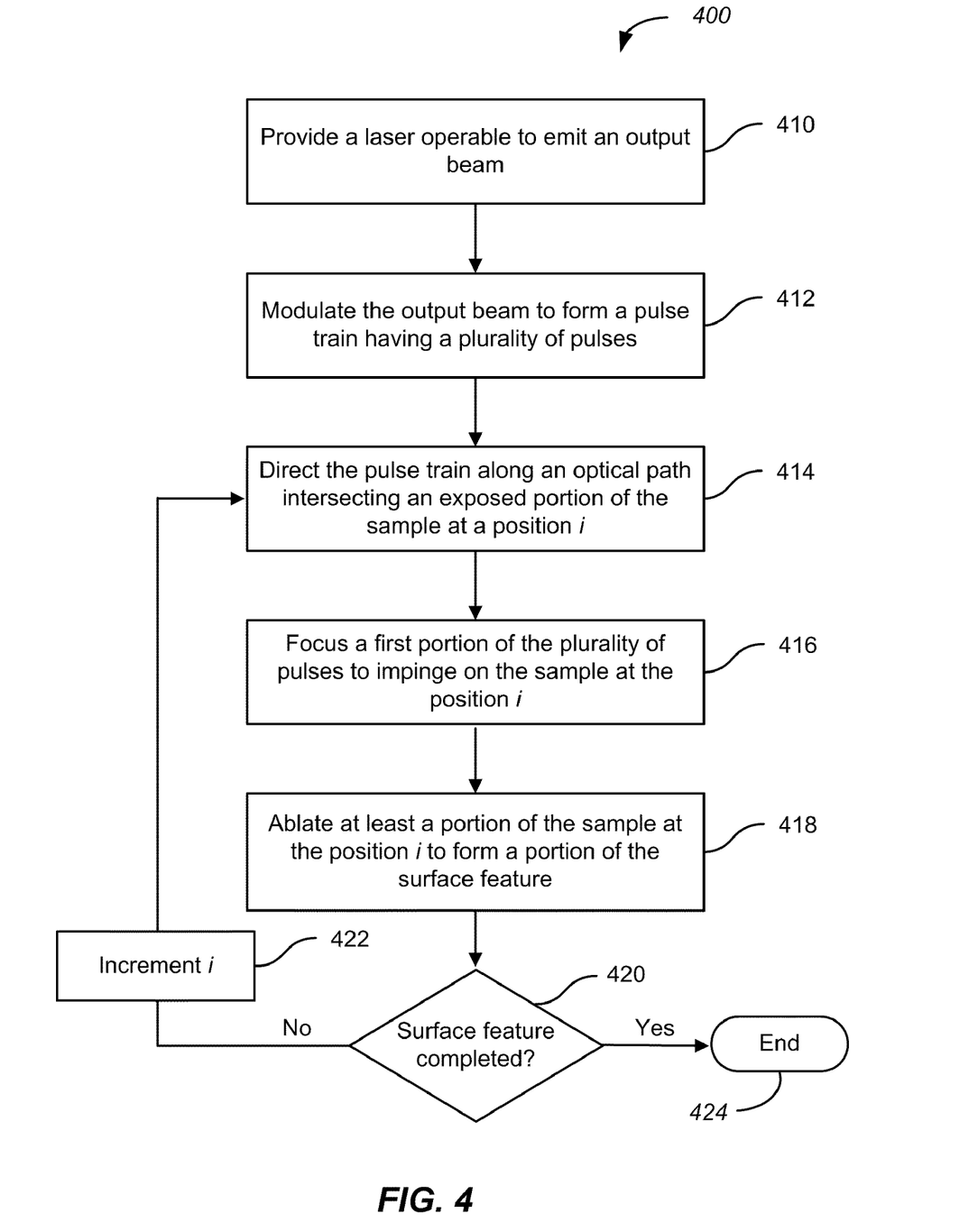
FIG. 4 is a simplified flowchart illustrating a method of forming a surface feature according to an embodiment of the present invention.

FIG. 4 is a simplified flowchart illustrating a method of forming a surface feature according to an embodiment of the present invention. During the operation of high power laser systems, laser irradiation can produce a variety of damage to optical elements utilized in the beam line of the high power laser system. As an example, laser pulses can heat portions of the surface of an optical element, producing stress fractures, subsurface cracks, and the like. Such damage sites typically grow in size with subsequent laser irradiation. According to embodiments of the present invention, a method of forming a surface feature extending into a sample is provided. The method (400) includes providing a laser operable to emit an output beam (410). The method also includes modulating the output beam to form a pulse train having a plurality of pulses (412). In some embodiments, the output beam is modulated using an acousto-optic modulator (AOM), for example, a model AOM600-1108 AO Modulator available from the Isomet Corporation of Springfield, Va. The temporal duration (i.e., the pulse length) of the pulses in the pulse train is on the order of a few tens of microseconds. As an example, the pulses can have pulse lengths of 5 µs, 10 µs, 15 µs, 20 µs, 25 µs, 30 µs, 40 µs, 50 µs, 75 µs, 100 µs, 125 µs, 150 µs, 175 µs, or 200 µs. As described more fully throughout the present specification, the short pulse length and small laser spot size minimizes the volume of material heated, thus minimizing the residual stress, and increases the ablation temperature, thus reducing the amount of re-deposited material as well as the size of any re-deposited particles, which increases their damage threshold.

The method further includes directing the pulse train along an optical path intersecting an exposed portion of the sample at a position i (414) and focusing a first portion of the plurality of pulses to impinge on the sample at the position i (416). Each of the plurality of pulses is characterized by a spot size of the beam at the sample. According to embodiments of the present invention, the spot size at the sample (the focused spot of lens 334 in this embodiment), which can be specified in terms of a beam waist measured at the $1/e^2$ points, i.e., the diameter at which the intensity falls to 13.5% of the peak value, or the like, is on the order of 100 µm in diameter. As an example, the pulses can have spot sizes of ranging from approximately 20 µm to several millimeters for 10.6 µm wavelength depending on the specific optical configuration and laser beam quality. As described more fully throughout the present specification, the small spot size minimizes the volume of material heated, thus minimizing the residual stress, and minimizes the thermo-capillary flow, which creates raised rims and other undesirable shapes in the final surface feature.

The method includes ablating at least a portion of the sample at the position i to form a portion of the surface feature (418). The pulse energy is selected to form a pit a few microns deep and a few tens of microns in diameter in response to a single pulse. As an example, the pulse energy can be 0.1 mJ, 0.2 mJ, 0.3 mJ, 0.4 mJ, 0.5 mJ, 0.75 mJ, 1.0 mJ, 0.2 mJ, 1.25 mJ, 1.5 mJ, 1.75 mJ, or 2.0 mJ. Multiple pulses can be directed and focused at a location to ablate the material using the multiple pulses. Because of the characteristics of the laser pulses, the ablation process produces substantially no re-deposition, providing a rim-free surface feature and leaves a surface essentially the same as that of a pristine surface free of micro-cracks.

If the surface feature is not completed (420), then the counter i is incremented (422) and the steps of directing, focusing, and ablating are performed for subsequent positions i. In this manner, the focused laser spot is moved in a predetermined pattern and speed over the surface to produce the desired final shape for the surface feature while completely removing the damaged material by ablation. When the formation of the surface feature is completed (420), then the process is terminated (424). Utilizing embodiments of the present invention, the surface feature is substantially free of a rim surrounding the surface feature and the faces of the final surface feature are essentially the same as that of a pristine surface free of micro-cracks.

It should be appreciated that the specific steps illustrated in FIG. 4 provide a particular method of forming a surface feature extending into a sample according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

In some embodiments of the present invention, light having a circular polarization is utilized to ablate the material of interest. As will be evident to one of skill in the art, some laser machining systems utilize circularly polarized light to reduce or eliminate asymmetries caused by p- and s-polarizations as the incident light interacts with different sides of the feature being formed. According to a specific embodiment of the present invention, a quarter-wave reflector is utilized to convert linearly polarized light into circularly polarized light. It should be noted that in some high power applications, reflective optics provide benefits over transmissive optics (e.g., a quarter-wave plate), which can be limited in power handling capability at 10.6 µm due to absorption. Utilizing circular polarization, it is possible to reduce or eliminate asymmetry in structures formed according to embodiments of the present invention. Additionally, the use of circularly polarized light enables the use of shorter pulse lengths (e.g., 5 µs compared to 12.5 µs in one design) without inducing irregular structures in the walls of the featured fabricated (e.g., cones). Without limiting embodiments of the present invention, the inventors believe that irregularities in the ablated features are caused by so-called polaritons. Additionally, shorter pulses can reduce the amount of re-deposited material and can increase the damage threshold associated with re-deposited material.

In some embodiments of the present invention, a vacuum nozzle is utilized to further reduce the amount of re-deposited material by drawing the ablated material and particulates into a vacuum orifice within a few millimeters of the surface. This can be desirable to prevent dispersal of the ablated nanoparticles over large areas, or to better control re-deposit when the damage site itself strongly perturbs the ejection and re-deposit pattern of the ablated material.

Some laser machining systems utilize this technique with commercially available nozzles having a wide variety of design options. According to a specific embodiment of the present invention, the nozzle orifice is 5 mm in diameter and 5 mm from the sample surface. A vacuum window allows the focusing beam to enter the vacuum chamber of the assembly. The beam exits through the nozzle orifice. A vacuum port is provided in the side of the assembly and is attached to a simple aspirator-type vacuum pump.

According to embodiments of the present invention, the pulse repetition frequency is adjusted so that the average laser power incident on the surface does not raise the temperature in regions adjacent to the ablation pit produced by the pulses above a temperature associated with thermo-capillary flow for the material being processed. This frequency is a balance between overall processing time and localizing the thermo-capillary flow. The final feature is much larger than that produced by a single pulse since it is built up from a large number of small excavations resulting in a "smooth" large-scale shape with an overlay of higher spatial frequency structure whose amplitude is that produced by a single pulse (i.e., of the order of a micron). Since these higher spatial frequencies result from small-scale features, intensifications produced by the higher spatial frequency features occur within a millimeter of the surface and typically do not lead to damage of other optical surfaces. Because significant thermo-capillary flow does not occur under these conditions, rastering the $CO_2$ beam in this way allows precise control of the resulting shape.

The ablation temperatures utilized in embodiments of the present invention (e.g., 4000 to 5000 K) are higher than those occurring in conventional techniques (e.g., 2500 to 3000 K). Although these temperatures are higher than conventional temperatures, the pulse characteristics provided by embodiments of the present invention are such that the surface temperature dissipates quickly as a function of position and does not diffuse from the original laser exposure site to a significant extent. As discussed above, the evaporation velocity of material at the surface is extremely high so that a significant fraction of the energy deposited by the pulse leaves rapidly with the ejected (ablated) material. Consequently, the ejected material does not build up in a thick layer near the surface, where it can condense to form re-deposited material. In fact, the inventors have determined that for fused silica optical elements, the lateral size of the re-deposited fused silica formed under the conditions described herein is much smaller (e.g., diameter<<100 nm) than that produced by conventional techniques (e.g., diameter on the order of 1 μm to 2 μm). According to embodiments of the present invention, re-deposited material on the surface of a fused silica optical element has a laser damage threshold at 351 nm greater than 13 $J/cm^2$ for a 5 ns pulse with a substantially constant intensity as a function of time, this being somewhat higher than the damage threshold of re-deposited material produce by conventional techniques.

Some embodiments of the present invention produce surface features after removal of damage that have a significantly higher damage threshold than conventional surface features. The higher damage threshold may obviate the need for remelting that is typically used to raise the damage threshold. Because there is little heating of the surface which remains after mitigation, little stress is frozen into the mitigated site, an advantage of embodiments of the present invention since residual stress can lead to crack growth in the presence in any surface flaws formed near the mitigation site. According to embodiments of the present invention, the resulting mitigation site is characterized by a stress below the fracture limit of fused silica in the presence of 300 μm long cracks, which for example, could be caused by mechanically induced cracking or by laser exposure after creation of the mitigation site.

The methods and systems described herein contrast with laser ablation techniques based on very short pulse lasers such as Ti-sapphire lasers operating near the visible wavelength range (~1 μm and shorter) producing pulses less than a few picoseconds in pulse length. These lasers ablate material using more violent, non-thermal means, which can produce cracks and laser damage-prone material. In contrast with these conventional techniques, embodiments of the present invention produce a predetermined shape (i.e., a surface feature) in the optical element using an inexpensive $CO_2$ laser. The final predetermined shape is made up of numerous small pits formed during raster scanning of the laser across the surface of the optical element in a controlled way. Each of the numerous small pits are generated by the absorption of near-IR laser light under conditions in which the evaporation velocity is high and the dwell time is short. This ensures that little thermo-capillary flow occurs that would otherwise make precise control of the resulting feature difficult to control. Because the process involves melting, evaporation, and then resolidification, the resulting surface has few defects or micro-cracks and is thus resistant to laser damage. The methods and techniques described herein are applicable to any optical material that absorbs strongly at 10.6 μm. Moreover, in other embodiments, other laser sources in addition to $CO_2$ lasers are utilized for materials that have absorption bands at other wavelengths. Thus, the present invention is not limited to the use of $CO_2$ lasers, which are discussed in order to provide examples of the present invention.

Figure 5:
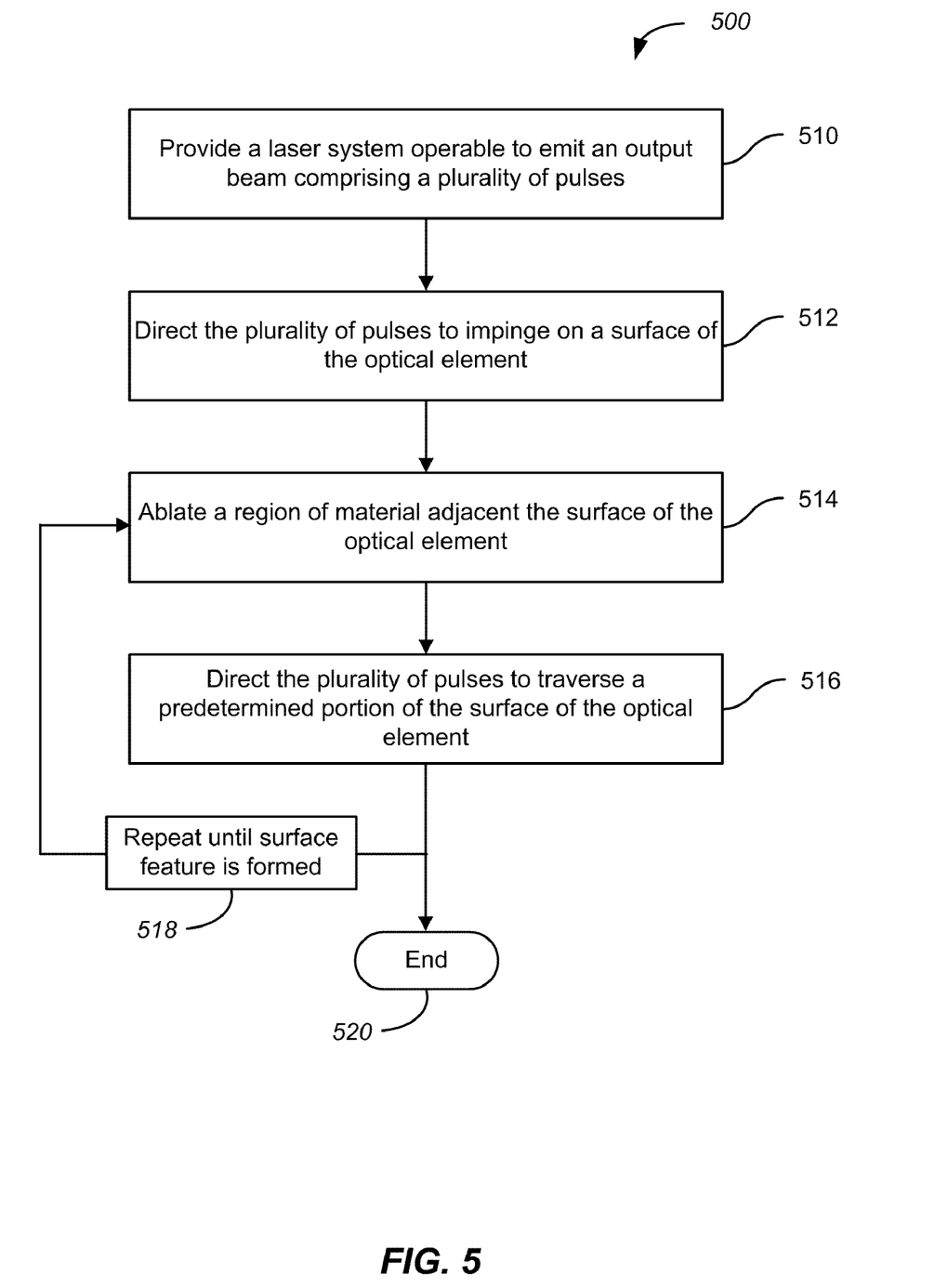
FIG. 5 is a simplified flowchart illustrating a method of processing an optical element according to an embodiment of the present invention.

FIG. 5 is a simplified flowchart illustrating a method of processing an optical element according to an embodiment of the present invention. The method 500 includes providing a laser system operable to emit an output beam comprising a plurality of pulses (510). In some embodiments the laser system is a CW laser system optically coupled to an external modulator as illustrated in FIG. 3. In other embodiments, the laser system is a pulsed laser system such as a Q-switched or fiber laser that generates pulses without the use of an external modulator. The method also includes directing the plurality of pulses to impinge on a surface of the optical element (512). As illustrated in FIG. 3, a set of scanning mirrors can be utilized to direct the beam to the sample. In other embodiments, other techniques are utilized as appropriate to the particular application.

A region of material adjacent the surface of the optical element is ablated (514). According to an embodiment of the present invention, a beam waist of the each of the plurality of pulses, measured at the surface, is less than 150 μm in diameter. As described above, the pulse energy and the spot size at the sample, among other factors, result in a pulse intensity that ablates material in a localized area with little to no thermal thermo-capillary flow. The method further includes directing the plurality of pulses to traverse a predetermined portion of the surface of the optical element (516). The steps of ablating and directing are repeated until a surface feature extending below the surface of the optical element is formed (518). In this way, the laser pulses are scanned across the optical element to form a predetermined surface feature. Scanning of the laser pulses is accomplished by repetition of the loop and updating of the position of the ablation operation with each step of the loop. A peripheral height of the surface feature above the surface of the optical element is less than 0.1 μm in some embodiments. After the surface feature is formed, the method is terminated (520).

It should be appreciated that the specific steps illustrated in FIG. 5 provide a particular method of forming a surface feature extending into a sample according to another embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. A method of forming a surface feature extending into a sample, the method comprising:
   providing a laser operable to emit an output beam;
   modulating the output beam to form a pulse train having a plurality of pulses;
   a) directing the pulse train along an optical path intersecting an exposed portion of the sample at a position i;
   b) focusing a first portion of the plurality of pulses to impinge on the sample at the position i, wherein each of the plurality of pulses is characterized by a spot size at the sample;
   c) ablating at least a portion of the sample at the position i to form a portion of the surface feature;
   d) incrementing counter i;
   e) repeating steps a) through d) to form the surface feature, wherein the sample is substantially free of a rim surrounding the surface feature.

2. The method of claim 1 wherein the laser comprises a $CO_2$ laser emitting an output at 10.6 µm.

3. The method of claim 1 wherein modulating the pulse train comprises passing the output beam through an acousto-optic modulator.

4. The method of claim 1 wherein each of the plurality of pulses is characterized by a pulse width ranging from 1 µs to 100 µs.

5. The method of claim 1 wherein the spot size ranges from about 20 µm to about 500 µm.

6. The method of claim 1 wherein the sample is characterized by a surface below which the surface feature extends and the rim surrounding the surface feature extends above the surface by less than 100 nm.

7. The method of claim 1 wherein the sample comprises a fused silica material.

8. The method of claim 1 wherein the sample comprises a ceramic material.

9. The method of claim 1 wherein the sample comprises at least one of a plastic, a polymer, a crystal, or a semiconductor material.

10. The method of claim 1 wherein ablating at least a portion of the sample comprises evaporation of melted material.

11. A method of processing an optical element, the method comprising:
    providing a laser system operable to emit an output beam comprising a plurality of pulses;
    directing the plurality of pulses to impinge on a surface of the optical element;
    ablating a region of material adjacent the surface by evaporation of melted material, wherein a beam waist of the each of the plurality of pulses at the surface of the optical element is less than 150 µm in diameter;
    scanning the plurality of pulses to traverse a predetermined portion of the surface of the optical element; and
    repeating the ablating and scanning to form a surface feature extending below the surface of the optical element, wherein a peripheral height of the surface feature above the surface of the optical element is less than 100 nm.

12. The method of claim 11 wherein the surface of the optical element is substantially free from re-deposition resulting from the ablating.

13. The method of claim 11 wherein the surface of the optical element is substantially free of stress resulting from the ablation.

14. The method of claim 11 wherein the laser system comprises a $CO_2$ laser and the output beam has a wavelength of 10.6 µm.

15. The method of claim 14 wherein the laser system comprises an acousto-optic modulator.

16. The method of claim 11 wherein the surface feature comprises a cone having a base diameter ranging from 0.1 mm to 2.5 mm and extending into the optical element by at least 10 µm.

17. The method of claim 11 wherein the surface feature comprises at least one of a parabolic cone or a four-sided pyramid.

18. The method of claim 11 wherein the surface feature comprises an array of micro-optical elements.

19. The method of claim 11 wherein the optical element comprises a biological material.

20. The method of claim 11 wherein the beam waist is less than 100 µm.

21. The method of claim 11 wherein each of the plurality of pulses are characterized by a beam waist less than 200 µm, a pulse length of less than 100 µs, and an energy of less than 3 mJ.

22. The method of claim 21 wherein the beam waist is less than 125 µm, the pulse length is about 25 µs, and the energy is about 1 mJ.

23. The method of claim 11 wherein the optical element comprises a fused silica lens.

* * * * *